No. 692,204. Patented Jan. 28, 1902.
C. S. LEONARD.
REVERSING VALVE MECHANISM.
(Application filed May 2, 1901.)
(No Model.)
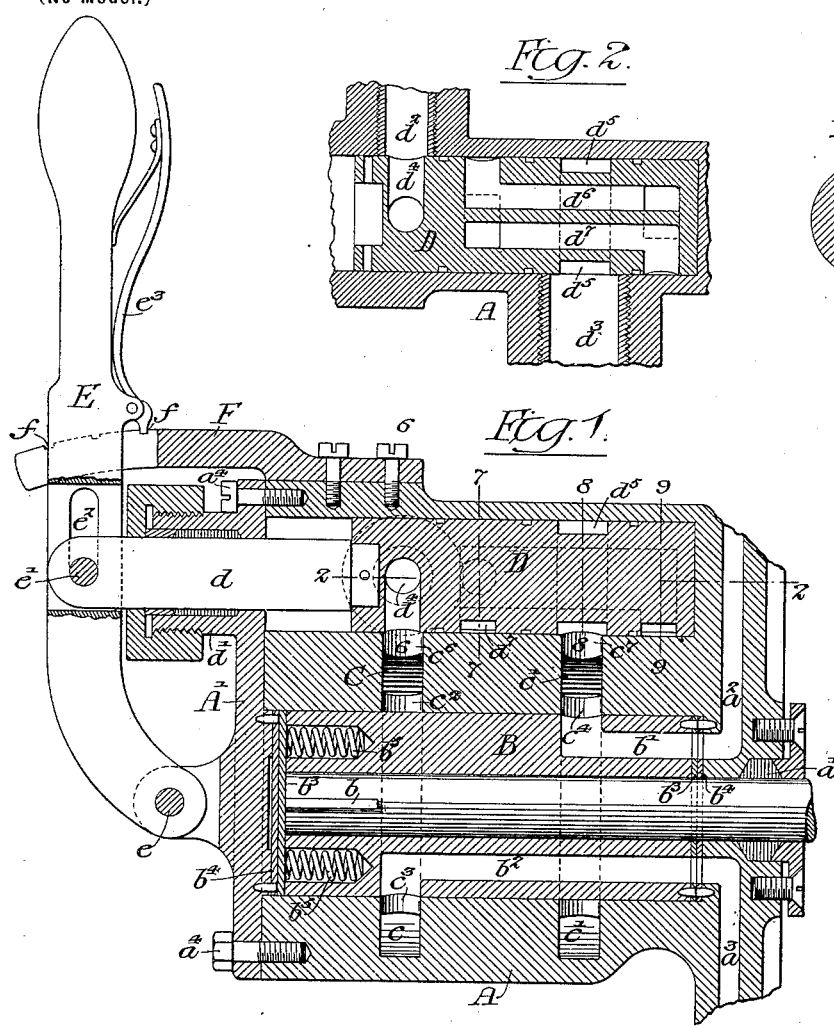
Witnesses:—
Herman E. Mixsus.
Louis M. T. Whitehead.
Inventor:—
Chester S. Leonard.
by his Attorneys:—
Howson & Howson

UNITED STATES PATENT OFFICE.

CHESTER S. LEONARD, OF PHILADELPHIA, PENNSYLVANIA, ASSIGNOR OF ONE-HALF TO FRANCES J. WISE, OF PHILADELPHIA, PENNSYLVANIA.

REVERSING-VALVE MECHANISM.

SPECIFICATION forming part of Letters Patent No. 692,204, dated January 28, 1902.

Application filed May 2, 1901. Serial No. 58,406. (No model.)

*To all whom it may concern:*

Be it known that I, CHESTER S. LEONARD, a citizen of the United States, residing in Philadelphia, Pennsylvania, have invented certain Improvements in Reversing-Valve Mechanism, of which the following is a specification.

My invention relates to certain improvements in valve mechanism for engines, having for its object the provision of an efficient and simple device for controlling the admission of steam or other motive fluid to the cylinder of an engine. This object I attain as hereinafter set forth, reference being had to the accompanying drawings, in which—

Figure 1 is a vertical sectional view through a valve-casing, showing my improved valve mechanism. Fig. 2 is a horizontal sectional view on the line 2 2, Fig. 1. Fig. 3 is a side view of the rotary admission-valve. Figs. 4 and 5 are end views of the rotary valve; and Figs. 6, 7, 8, and 9 are vertical sectional views of the reversing-valve, taken on the lines 6 6, 7 7, 8 8, and 9 9, respectively, Fig. 1.

In the drawings, A is the valve-casing, having in it two cylindrical chambers in which are valves B and D and provided with a head A', held in place by bolts or screws $a^4 a^4$. The casing here shown is designed to be attached to and used in connection with a multiple-cylinder engine, the main shaft $a$ of which enters the said casing through a stuffing-box $a'$. Ports $a^2 a^3$ lead to the cylinders of the engine and enter one of the above-mentioned chambers in the casing at its end nearest the said engine. Within this chamber is the cylindrical valve B, fixed by a key $b$ to the shaft $a$ and having passages $b' b^2$ running through it. The horizontal portions of these passages are placed at the same distance from the center of the shaft $a$, and each has an opening at the end of the valve, being constructed in the valve illustrated so that the said openings come opposite the ports $a^2$ and $a^3$ once in each revolution of the valve.

The preferred shape of the horizontal sections of the passages $b' b^2$ is shown in Fig. 5, and after passing into the valve a certain distance they turn at right angles, having rectangular openings on the cylindrical surface of said valve one hundred and eighty degrees distant from each other, as indicated in Fig. 3.

Each end of the valve B is provided with hardened-metal plates $b^3 b^3$, held in place by pins, as shown, and there are similar plates $b^4 b^4$ at each end of the valve-chamber, against which the plates $b^3$ act. At the end of the valve nearest the engine-cylinders the plates $b^3 b^4$ are made with openings through them corresponding to the steam-passages $b' a^2$ and $b^2 a^3$.

Springs $b^5 b^5$, placed in suitable recesses $b^6$ in the valve B, press one of the plates $b^3$, thereby insuring uniform wear of the plates and making a tight joint between the end of the valve and the surface upon which open the ports $a^2 a^3$.

Within the body of the casing A and formed concentrically with the valve B are two annular passages $c c'$, as indicated by dotted lines in Fig. 1, there being in the present instance two openings $c^2 c^3$ and $c^4 c^5$, respectively, leading from each passage into the chamber containing the said valve B at points one hundred and eighty degrees apart. The opening from the passage $b'$ of the valve B passes by the two openings $c^4 c^5$ at each revolution of the said valve, as does also the opening of the passage $b^2$ pass by the two openings $c^2 c^3$.

There are two openings $c^6$ and $c^7$ connecting the annular passages $c$ and $c'$, respectively, with the chamber in which is the valve D. This valve is preferably cylindrical in form and is constructed to be reciprocated within its chamber. For this purpose a valve-rod $d$ is pinned to it, the said rod extending through a stuffing-box $d'$ in the head A'. An operating-lever E is pivoted to the said head A' at $e$ and is connected to the rod $d$ by a pin $e'$, there being a slotted opening $e^2$ provided in said lever in which the pin $e'$ may slide as the lever is reciprocated. A piece F, made in the arc of a circle, is suitably attached to the valve-casing A and has in it notches $f f$ made to receive one end of a pivoted latch-piece $e^3$ on the lever E, whereby said lever may be retained in any desired position.

The valve D has four series of passages running through it, and there are, besides the two passages $c^6$ and $c^7$, a main inlet-passage $d^2$ and a main exhaust-passage $d^3$ also opening into its chamber. In the position shown in Figs.

1 and 2 a passage $d^4$ in the valve D connects the inlet $d^2$ with the opening $c^6$ to the annular passage $c$, and an annular passage $d^5$ allows fluid to flow from the opening $c^7$ to the main exhaust $d^3$. When by means of the lever E the valve D is moved to the other end of its chamber, a passage $d^6$, running through the body of the valve, connects the inlet-passage $d^2$ with the opening $c^7$, and a similar passage $d^7$ connects the opening $c^6$ with the exhaust $d^3$.

It will be noted from an inspection of the figures that of the passages entering the chamber of the valve D two come in at the bottom and the others at points ninety degrees on either side of the two entering at the bottom. Of the passages in the valve the two ends of each one open in planes lying at an angle of ninety degrees to each other.

In operation steam or other motive fluid enters through the inlet $d^2$. From here it passes through the passages $d^4 c^6$ around the annular passage $c$ to $c^3$ $b^2$ and into the steam-port $a^3$, from whence it is admitted to one end of an engine designed to take steam at one end only. Simultaneously steam is being exhausted from a similar engine-cylinder set opposite to the first one through the port $a^2$ and passages $b'$ $c^4$ $c'$ $c^7$ $d^5$ to the main exhaust $d^3$. When the mechanism has made one-half of a revolution, the passage $b^2$ has come opposite the port $a^2$ and is in communication with the passage $c$ through the opening $c^2$, thereby admitting steam to the cylinder in connection with the port $a^2$. At the same time the passage $b'$ has connected the port $a^3$ and the passage $c'$ in the valve, thereby allowing the steam to exhaust from the said port through $c^7$ and $d^5$ to the main exhaust $d^3$. When it is desired to reverse the direction of rotation of the shaft $a$, the valve D is moved by means of its lever E until the passage $d^6$ connects the inlet $d^2$ and the opening $c^7$, and the passage $d^7$ connects the opening $c^6$ and the main exhaust. By this means the motive fluid is admitted to an engine-cylinder which has just been exhausting and a cylinder is connected to the exhaust which was previously in position to take steam.

As shown in the drawings, there are grooves $g$ $g$ cut in the surface of the valve D, into which packing-rings are fitted to prevent any possible leakage between the valve and the walls of its chamber.

It will be understood that my improved mechanism may be used in connection with an engine having any desired number of cylinders, it requiring but slight modification of the valve-casing to provide the necessary passages.

I claim as my invention—

1. The combination of a valve-casing having in it a valve-chamber, an inlet and an exhaust passage opening into said chamber, two other passages also opening into the chamber, a valve in the chamber, passages in said valve normally connecting the inlet with the first of the passages in the casing, and the exhaust with the second passage, two other passages in the valve and means for moving the said valve longitudinally whereby the second set of passages in the valve are brought into use and the connections of the two passages in the casing are reversed, substantially as described.

2. The combination in a valve-casing having a valve-chamber into which open an inlet and an exhaust passage, two other passages entering the chamber, a valve in said chamber, four passages therein and means for reciprocating the valve, the said passages in the valve being constructed to connect either one of the passages opening into the valve-chamber with either the inlet or the exhaust passage when said valve is reciprocated substantially as described.

3. In a reversing-valve, the combination of a casing having a valve-chamber, a valve therein having two sets of passages running through it, four passages entering the valve-chamber, one set of passages in the valve connecting said passages entering the casing in pairs, the second set reversing the connections of said passages when the valve is moved longitudinally, substantially as described.

4. The combination of a casing having a valve-chamber, a valve therein, an inlet and an exhaust passage opening into said chamber, two other passages also entering the chamber, means for reciprocating the valve, said valve having an annular recess around it and three passages running through it, being constructed to reverse the direction of flow of a fluid through to the passages in the valve-casing when the valve is moved, substantially as described.

5. The combination in a valve mechanism for an engine, of a casing having two valve-chambers, a reversing-valve constructed to be reciprocated in one chamber and a second valve constructed to continuously rotate in the other chamber, passages in the valves, passages connecting the chambers, and other passages leading from the chambers to the engine-cylinders and an inlet and an exhaust passage in the casing, substantially as described.

6. The combination of a casing having two valve-chambers, an inlet and an exhaust passage opening into one of the same and passages connecting the chambers, a rotary admission in one chamber connected to the ports of a steam-engine, and a cylindrical reversing-valve in the other chamber constructed to reverse the direction of flow of motive fluid through the passages of the rotary valve when said second valve is operated, substantially as described.

7. In a valve mechanism for an engine, the combination of a casing, two valve-chambers therein, an inlet and an exhaust passage entering one chamber, two passages connecting the two chambers, ports leading from the second chamber to an engine, a rotary valve in said second chamber, constructed to be operated by said engine, and a reversing-valve in the first chamber whereby either of the passages connecting the chambers may be connected to the inlet or exhaust at will, substantially as described.

8. The combination of a casing, two valve-chambers therein, an inlet and an exhaust passage leading to one of said chambers, annular passages extending around the second chamber having passages connecting them to both chambers, a rotary valve in the second chamber connecting it to an engine, and a cylindrical reversing-valve constructed to be longitudinally reciprocated in the first chamber whereby the direction of flow of fluid through the ports of the engine may be reversed, substantially as described.

9. The combination of a casing, a cylindrical valve-chamber therein, ports leading to an engine opening into one end of said chamber, inlet and exhaust passages opening on the curved surface of the chamber, and a valve in said chamber having passages through it constructed to periodically connect said ports alternately with said inlet and exhaust passages, substantially as described.

10. The combination of a casing, a cylindrical valve-chamber therein, ports leading to an engine, opening into one end thereof, annular passages surrounding the said chamber, openings from each of said passages into the chamber, a valve constructed to rotate in said chamber, having in it passages, one of said passages opening on the end of the valve and on its curved surface in the plane of the openings from one of the annular passages, and the other passage also opening on the end of the valve and on its curved surface in the plane of the openings from the other annular passage, substantially as described.

11. The combination of a casing having a cylindrical valve-chamber, a valve therein, hardened-metal plates at each end of said chamber, other plates on the ends of the valve, and means for keeping said plates in contact with each other.

12. The combination of a casing having a cylindrical valve-chamber, a valve therein, hardened-metal plates at each end of the chamber, other plates on the ends of the valve, and springs set in recesses in the valve and arranged to keep said plates in contact with each other.

13. The combination of a casing having a cylindrical valve-chamber, a valve therein having passages opening at its ends and on its curved surface, hardened-metal plates on the ends of the valve and similar plates at the end of the chamber, and passages in the casing, the plates at the ends of the valve having passages through them, substantially as described.

In testimony whereof I have signed my name to this specification in the presence of two subscribing witnesses.

CHESTER S. LEONARD.

Witnesses:
WILLIAM E. BRADLEY,
JOS. H. KLEIN.